July 21, 1931.    C. G. OLSON    1,815,324
METHOD OF MAKING MILLING CUTTERS
Filed Aug. 9, 1927    4 Sheets-Sheet 1

INVENTOR
CARL G. OLSON
BY Cheever & Cox
ATTYS

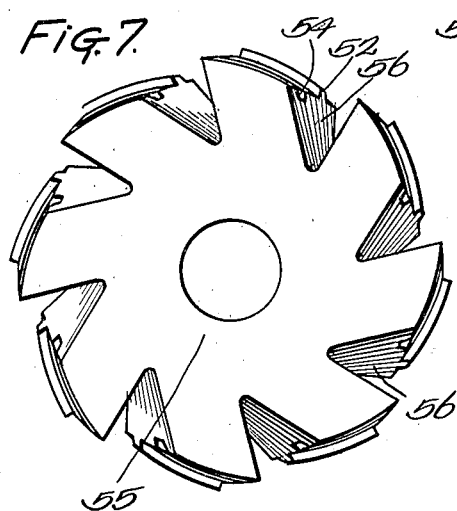
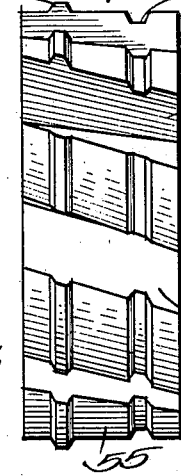
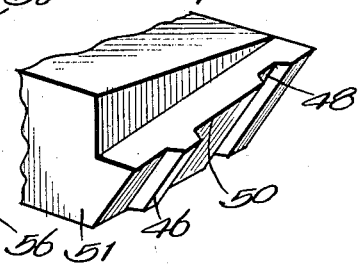
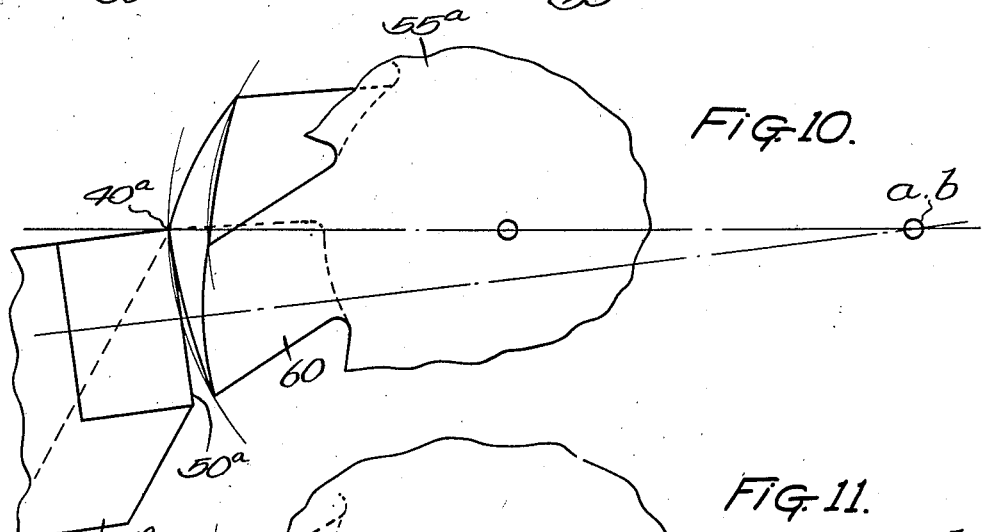
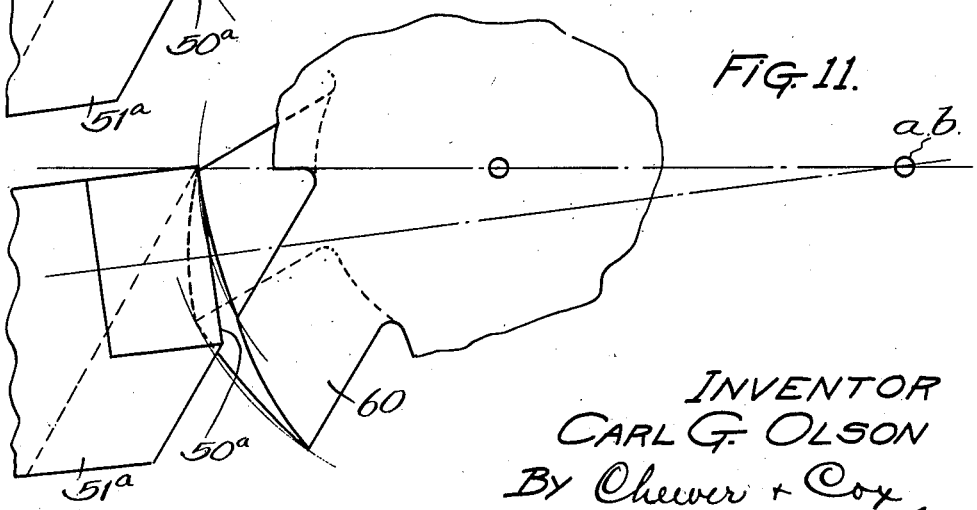

INVENTOR
CARL G. OLSON
By Cheever + Cox ATTYS

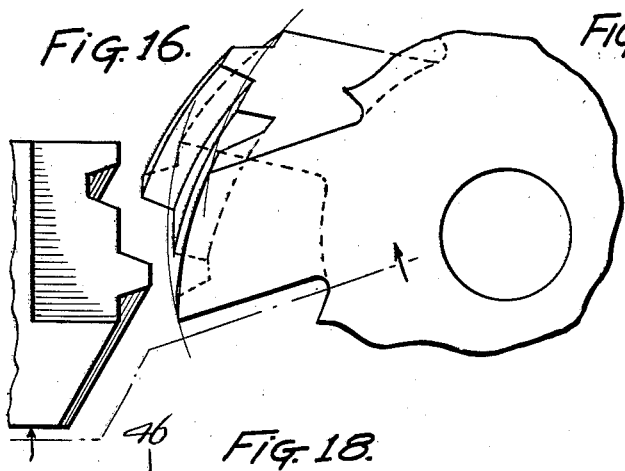
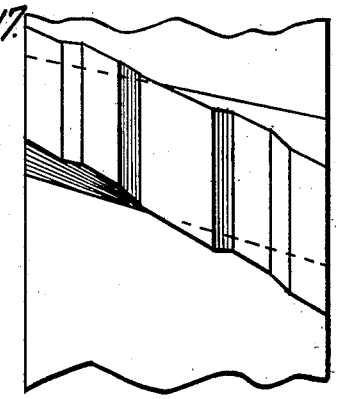
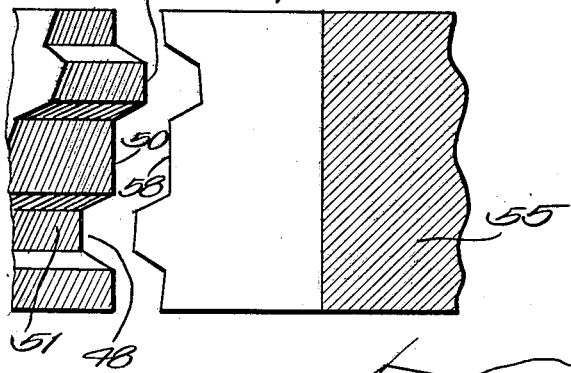
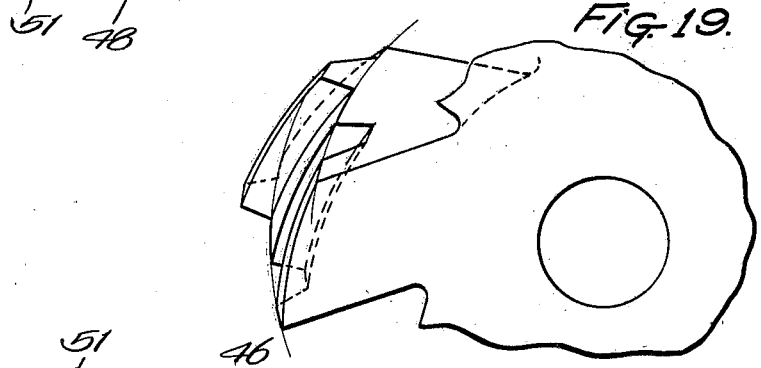
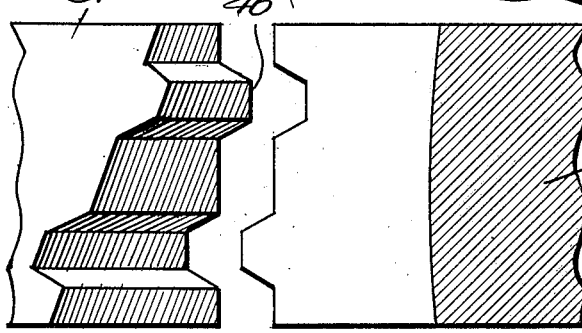
INVENTOR
CARL G. OLSON
By Cheever + Cox
ATTYS Patented July 21, 1931

1,815,324

UNITED STATES PATENT OFFICE

CARL G. OLSON, OF CHICAGO, ILLINOIS, ASSIGNOR TO ILLINOIS TOOL WORKS, OF CHICAGO, ILLINOIS, A CORPORATION OF ILLINOIS

METHOD OF MAKING MILLING CUTTERS

Application filed August 9, 1927. Serial No. 211,725.

My invention relates to the production of cutters, and the general object of the invention is to produce the cutters in such manner as to allow for the shrinkage and distortion resulting from the tempering process occurring after the cutter is made.

It is well known by those familiar with the art of hardening steel that a heated object, when quenched in a cooling bath, will shrink in cooling and that the projecting parts will cool quicker than the main body and consequently will contract before the main body contracts, thereby arresting the contraction of the main body and causing the well-known distortion that takes place in hardening tools. To illustrate, it has been demonstrated that a cube made of steel when heated and quenched in water will bulge on all six sides, making each side convex.

A milling cutter having a cylindrical body when subjected to heat treatment cools at the ends before the central portion, and therefore the metal at the ends will contract first and thereby cause a certain resistance to the shrinking of the central portion of the cylinder and prevent it from contracting to its original size. This action results in a barrel-shaped body instead of the original cylinder.

In order to be able to harden or heat treat a cylindrical object of tool steel and have it come out of the bath a true cylinder, it is necessary to know to what extent the heat treatment will affect the steel of the particular analysis selected, and the size and shape of the cylinder ultimately desired. Guided by this knowledge it is possible to provide for the alteration that occurs in the heat treatment, by making the object of a form that will compensate for the discrepancy that takes place.

My method provides for making the cylindrical body of the cutter concaved or hour-glass shaped to an extent that will just compensate for the shrinking of the ends and the bulging of the center of the body.

My invention or discovery proceeds in part upon the geometrical fact that a hyperboloid of revolution, a body referred to in common parlance as an hour-glass shaped body, results when a straight line generatrix is caused to pass around two parallel circles as directrices, the generatrix being askew to the axis of the two circles.

Likewise a hyperboloid of revolution will be produced if a cutting tool whose edge extends in a straight line coincident with the generatrix just mentioned, is moved radially toward a rotating cylinder whose ends are defined by the directrix circles just mentioned.

I have found that an hour-glass shaped body may also be produced by causing said cutting tool with its straight cutting edge, which is askew to the axis of the rotating cylinder, to sweep through an arc centered on an axis parallel to the axis of said rotating cylinder, the axis of the arc being on the far side of the cylinder from the cutting edge of the tool. In other words, according to my invention I employ a tool whose cutting edge extends (in general) across the face of the rotating body or work, the general line of the cutting edge being askew to the axis of rotation of the work and said cutting edge sweeping gradually through a cylindrical path whose axis is parallel to the axis of rotation of the work and on the opposite side of the work from the cutting edge of the tool.

It is known, of course, that where two lines are askew with reference to each other, there is one point, and one point only, which is nearer than any other to the nearest point on the other line. In the functioning of my method this specific point, which is on the cutting edge of the tool, produces the valley or lowest part of the curve of the work, i. e., the portion where the diameter of the finished piece of work is smallest.

In the preferred method the tool sweeps up through this arc only once to entirely finish the work, the work making many revolutions in the meantime.

In the illustrated form of the invention the cutting edge of the tool is not actually straight across the full width of the tool. A formed tool is employed, but the basic principle remains the same.

There are several benefits resulting from my invention, first, the work does not need to be trued up after it has been tempered.

Another advantage is that the work may be produced with a tool having straight cutting edges, like an ordinary formed tool and does not need to have its general outline curved or bowed in accord with the curvature of the work before hardening. The cutting edge, it is true, is stretched, lengthwise, longer than the ultimate form of work desired, but this is because the edge lies at an oblique angle, when cutting, as illustrated in physical perspective in Figure 9. If the profile be projected on a horizontal plane, however, it will be a true complement of the profile of the work as ultimately desired. Thus it may be said that the tool used in my process is stretched or extended axially but when projected in plan is a true complement of the correct form of finished and hardened cutter. This, of course, results in several important benefits. It makes the tool much simpler to construct, which reduces its cost and reduces the liability of improperly forming it. It also makes it possible to sharpen the tool with ordinary methods without destroying its proper shape and dimensions. The general line of contour being straight across the tool makes it possible to cut the tool back in sharpening without changing its profile. My method is capable of producing a cutter whose teeth are relieved and so formed that they may be sharpened without altering their profile. It is also applicable to a cutter of this type in which the flutes or gashes are helical or spiral in distinction to being straight, i. e., parallel with the axis.

The method is illustrated in the accompanying drawings in which Figure 1 shows a cylindrical body before hardening;

Figure 7 is an end view of a cutter which may be produced by my method. In this form the cutter has relieved teeth and helical flutes and the teeth are so formed that they may be sharpened without changing their profile.

Figure 8 is a face view of the form of work shown in Figure 7.

Figure 9 is a perspective view of the cutting end of a tool which will produce the type of work shown in Figures 7 and 8.

Figure 10 to 15 inclusive are diagrammatic views showing a straight line tool in different positions relative to the work. Ordinarily a formed tool will be employed instead of a straight line tool, but a straight line tool is shown in these diagrams for simplification and to facilitate an understanding of the principle of the invention.

Figure 16 is an end view (i.e., an axial view) of a typical formed tool and the work which results when my method is employed. This view is analogous to the diagram Figure 12. It will be understood that in Figure 16 the tool and work are separated in order that both may be more plainly seen.

Figure 17 is a face view of the work shown in Figure 16.

Figure 18 is a bottom view partly in section, as indicated by the line 18—18 of Figure 16. The teeth of the work, however, have been projected on a diametral plane in order to show the concave shape of the work prior to tempering.

Figure 19 is similar to Figure 16 except that it shows the work after at has been hardened.

Figure 20 is the same as Figure 18 except that it shows the work after it has been hardened.

Like numerals denote like parts throughout the several views.

I do not herein claim the mechanism by which the method may be carried out, as this forms the subject of a companion application Serial Number 261,484 filed by me on the 14th day of March, 1928.

Figure 1:
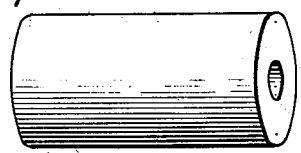
Figure 2:
Figure 2 shows the parallel shape which will result when a cylinder like Figure 1 has been hardened.
Figure 3:
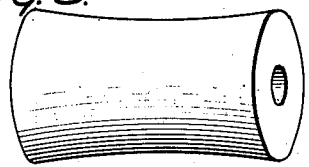
Figure 3 shows a body having an hour-glass shape, or a hyperboloid of revolution.
Figure 4:
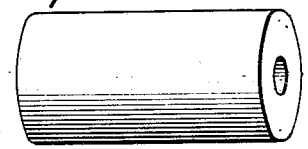
Figure 4 shows the cylinder which will be produced after it has been hardened.

The effect of hardening steel is illustrated in Figures 1 to 4, Figure 2 showing the barrel-shaped body that will result when a cylindrical body, as in Figure 1, is hardened and Figure 4 showing a truly cylindrical body which results from the hardening of a body shaped somewhat like an hour-glass, but with shallow concavity and probably more properly termed a hyperboloid of revolution. It will be understood that these figures, 1 to 4, are mere outline views for schematically representing the bodies of milling cutters and the like and not showing the teeth that, in practice, will be formed on them.

As a result of my method the cutter, i.e., the work, has the general outline typified in Figure 3 and after hardening, its general contour is truly cylindrical as illustrated in Figure 4, it being understood, of course, that the general contour is modified by the presence of teeth. The bodies in Figs. 1 to 4 are of a length about twice their diameter. This proportion can of course be varied and the work shown in Figs. 7 and 8 is of much shorter length, axially, in proportion to the diameter.

Figure 5:
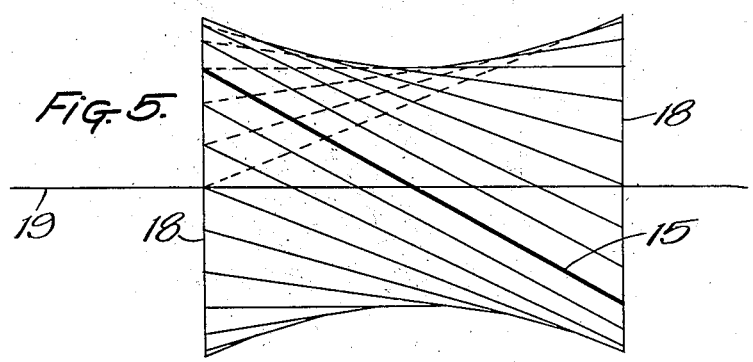
Figure 5 shows how a hyperboloid of revolution is produced by passing a straight line generatrix around two parallel circles of equal diameter.

In Figure 5 I have shown the conventional method of forming a hyperboloid of revolution, the straight line generatrix 15 being supposed to pass around the base circles or directrices 18 which are of the same diameter and parallel to each other, thus having a common axis 19. The generatrix is askew relatively to the axis of the body. This figure is offered as being chiefly suggestive to assist in understanding the principle of my invention, which is more definitely illustrated in Figure 6.

Figure 6:
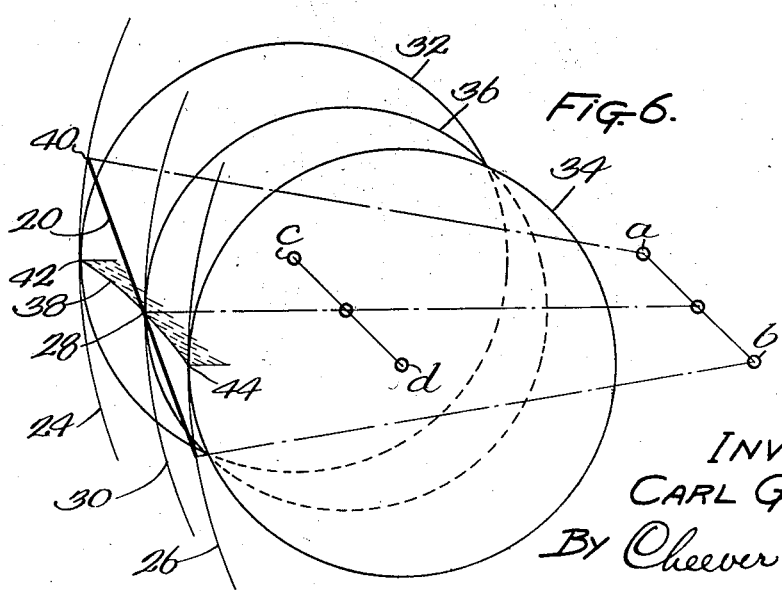
Figure 6 is a diagrammatic view in perspective showing the principle involved in my method, in which a straight line generatrix is placed askew relatively to the axis of the work and is caused to swing on an arc which is centered upon an axis parallel to the work axis and at a distance therefrom on the side opposite to the generatrix.

In this Figure 6 the generatrix is indicated by the line 20 which in practice swings through an arc centered along the axis a—b. This axis is parallel to the line c—d, which is the axis of rotation of the work. In the ordinary hyperboloid revolution the generatrix may be considered as revolving in a circular orbit whose axis is coincident with the axis of the rotation of the work. In my method the axis of the orbit of the tool is not coincident with the axis of the rotation of the work, and the radius of the orbit of the tool is greater than the radius of the orbit of the work. It will be understood that the line 20 represents simply the general contour of the cutting edge of the tool, although in practice said cutting edge is formed, i. e., configurated, instead of being straight, as will be hereinafter explained.

It will be evident by reference to Figure 6 that one end of the generatrix or cutting edge sweeps through an arc indicated by the line 24. The other end will sweep through an arc represented by the line 26, while the middle point 28 will sweep through an arc represented by the line 30. The central point 28 of the generatrix is closer to the axis a—b than any other portion of the generatrix, while the ends of the generatrix are farther from the axis a—b than any other portion of the generatrix. As the axes a—b and c—d are parallel and on the same side of the generatrix, the generatrix in sweeping upward through the arc indicated by the lines 24, 26, 30, will produce a body which I believe to be a hyperboloid of revolution, and whose ends are indicated by the circles 32, 34, and whose central zone is indicated by the circle 36. These circles are of course tangential to the arcs 24, 26, 30 and are centered upon the axis c—d. A diametral section is indicated by the shaded area 38.

As above suggested, in practice the generatrix or cutting edge of the tool passes slowly upward and in doing so the upper end 40 first engages the work (disregarding the thickness of the cut) at the point 42, which is at one end of the work and at the zone of largest diameter. After it has risen halfway up through the acting zone its middle point 28 will engage the middle zone of the work and be tangent to the central circle 36. It is this middle position which is illustrated in Figure 6. As the generatrix or cutting edge continues to rise it will finally become tangent to the circle 34 at the point 44. Thus it will in one motion have traversed the entire curved surface of the work and consequently will have completed it and produced the hyperboloid of revolution illustrated. It will be understood, however, that this upward sweep of the tool is very slow as the cutting operation over the whole surface of the work is completed during its occurrence.

Turning now to the practical application of the method; let it be assumed that it is desired to produce a helically fluted, relieved tooth cutter of the form shown in Figures 7 and 8. For this purpose a tool of the form shown in Figure 9 will be employed. Its cutting edge will have projections and recessions 46 and 48, but their cutting edges will have the same form and alignment as that desired in the finished work after hardening. In other words, the general alignment will be straight and not curved like the work prior to hardening. The form or configuration of the cutting edges will of course depend on the shape of the teeth desired in the finished hardened cutter, but no allowance need be made for the fact that the work will be produced at first with a concavity to allow for the distortion occurring during the subsequent hardening process. In other words, the tool in its general contour or alignment may be regarded as straight. This is of great importance for the tool may be given a form or profile exactly like the profile required in the finished hardened cutter, thus avoiding all calculations and allowances for uneven shrinkage in the work.

The cutting edge 50 of the tool is oblique to the tool body 51 as shown in detail in Figure 9. As a result the tool may be held in normal position in an ordinary tool post and at the same time present its cutting edge to the work in such manner that the portion adjacent to one end of the work will be higher than the portion at the opposite end, just as the generatrix 20 is oblique to the work as illustrated in the diagram, Figure 6. In other words, the cutting edge of the tool will be askew to the axis of the work when the tool is held in the ordinary manner in an ordinary tool-post.

A tool of the particular profile shown in Figure 9 will produce a cutter having a profile like that shown in Figures 7 and 8, in which there are projections 52 and recessions 54, formed in the cutter body 55. Cutters which are helically gashed or fluted cut more smoothly and with less shock or vibration than straight fluted cutters and hence it is preferable to select as the piece of work a body in which the flutes 56 have previously been formed in this manner. Consequently in Figures 7 and 8 is shown a helically fluted cutter body.

In Figures 7 and 8 the scale is too small to indicate the concavity of the cutter body, so I have increased the scale in Figures 16 to 20 inclusive.

It will be evident by referring to Figure 18 that the cutting edge 58 of the unhardened cutter body is concave; i. e., conforms in its aggregate outline, to a hyperboloid of revolution. The tool, however, shown at the left side of Figure 18, will be observed to be straight. In Figure 20 the tool is again shown, but in juxtaposition to it is shown the cutter as the same will appear after hardening. Here it will be observed that the aggregate outline of the hardened cutter is straight, thus exactly matching the tool, while the body portion 55 has become slightly barrel-shaped.

Referring now to the diagrams Figures 10 to 15 inclusive; I have simplified the form of tool and resulting cutter so that the tool may have a single straight line cutting edge analogous to the generatrix 20 of the diagram shown in Figure 6. This I shall designate 50$^a$ and the tool body 51$^a$. The cutter body, which is analogous to the cutter 55, is designated 55$^a$. Its profile will, of course, be plain as a result of the plain straight cutting edge of the tool.

In accordance with the principle illustrated in Figure 6, the high end 40$^a$ of the tool edge will be the first to engage the work. This is illustrated in Figure 10. The tool will, of course, at this time beat the lower end of the arc of travel of the tool centered at the axis $a$—$b$. The work, of course, rotates in a counter clock-wise direction and in Figure 11 I have shown a situation in which the specific cutter tooth 60 is leaving the tool. This is due to the rotation of the cutter body and not to the movement of the tool, for the latter rises very slowly, that is, after many revolutions of the cutter body.

Figure 12:
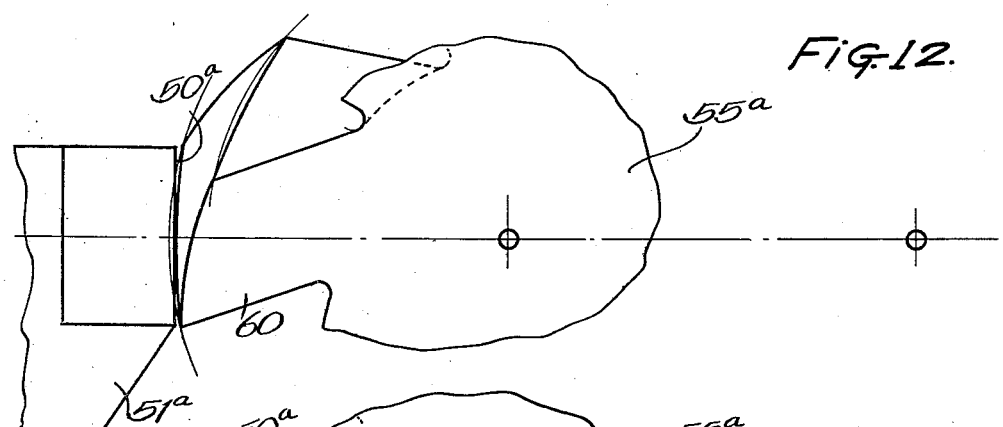
Figure 13:
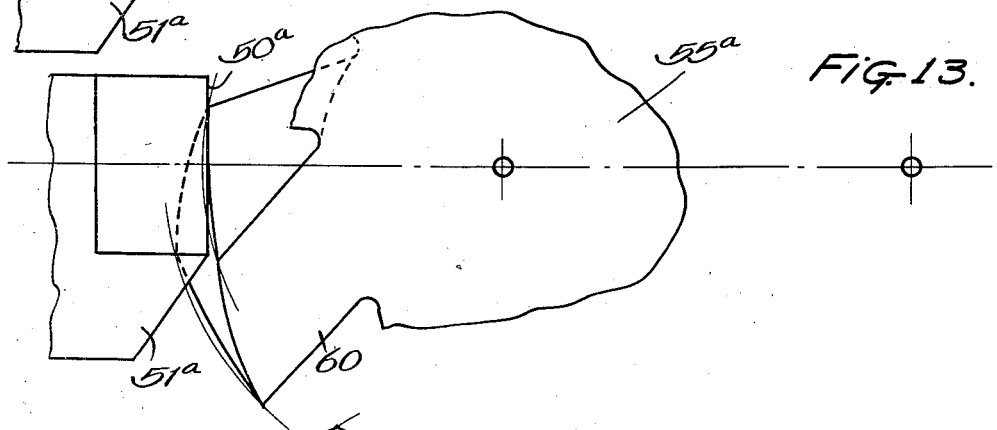

In Figure 12, the tool is shown in intermediate position, corresponding to point 28 of the diagram Figure 6. Figure 12 shows the specific tooth 60 first coming into contact with the tool and Figure 13 shows it leaving the tool.

Figure 14:
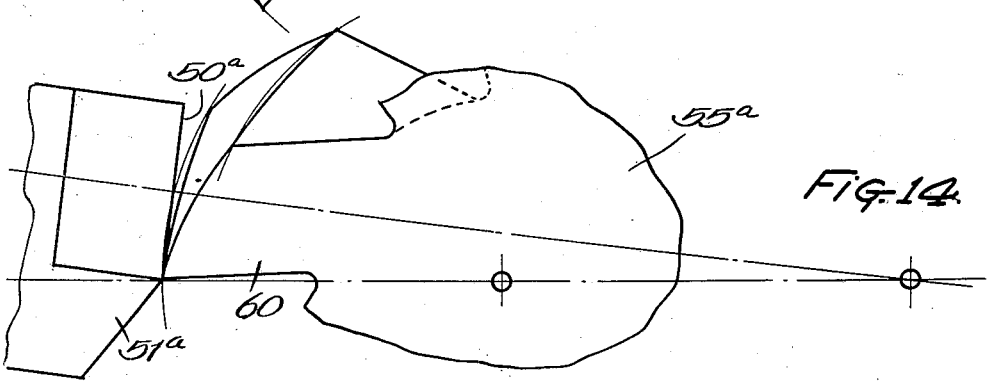
Figure 15:
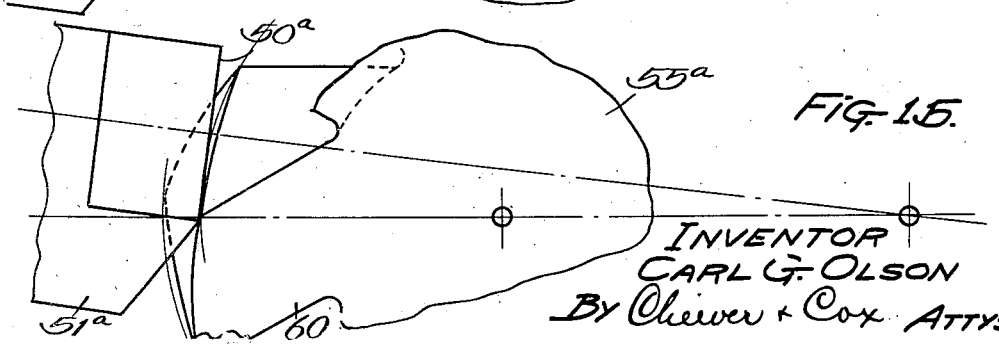

In Figures 14 and 15, the tool has risen to its uppermost position with the result that the lowermost part of the cutting edge of the tool is now in action, that is, the portion sweeping through the arc 26 of Figure 6. Figure 14 shows the situation as the specific tooth 60 is first coming into contact with the tool and Figure 15 shows the situation as the said tooth is leaving the tool. If a straight edge could be put into contact with the top of the tooth 60 parallel to the work axis $c$—$d$, it would be found that the surface is slightly concave, that is, resemble a hyperboloid of revolution, in accordance with the theory already explained. After hardening, this concavity will be straightened out and the straight edge would contact the tooth from end to end, (axially considered).

When cutters having relieved teeth are to be produced, which is the case illustrated and is also the ordinary case, there is an additional relative movement, i. e., a radial one. This is termed the "backing-off movement" and either the work may move intermittently toward and from the tool, or, as is more frequently the case, the tool may move toward and from the work.

As the teeth to be cut in the work are usually relieved and there is, consequently, a necessary backing-off movement of the tool relatively to the work, it is necessary that the backing-off movement bear a definite timed relation to the rotary movement of the work. Now, when a helically fluted cutter is to be made, it is necessary to compensate for this fact by slightly modifying the rate of rotation of the cutter body. In the present case where there is a right hand helical flute and the tool is rising, and the cutting occurs first at the left end of the cutter, the cutter will have to have its rotation slightly retarded. This retardation will be very slight compared to the aggregate number of revolutions of the work for it will aggregate only a fraction of a complete revolution.

As the axis of the arc through which the tool sweeps is on the far side of the work axis relatively to the tool, it may be said that the tool has an orbital movement which orbit envelopes the work.

To briefly recapitulate, according to my method in the illustrated form the cutter body or work is made to revolve about its axis and a tool is employed having a tooth profile exactly like that required in the finished product. The tool edge, however, instead of being held parallel to the axis of rotation of the cutter body, is held askew thereto and while the cutter body is rotating, the tool is caused to sweep past the cutter body in an arc having an axis parallel to the axis of the cutter body and located on the far side of said axis of the cutter body. That is, the tool travels in an orbit tangential to the cutter, which orbit encloses the cutter. At the same time there is a radial or backing-off movement of the tool and retardation of the rotation of the cutter to compensate for the orbital movement of the tool. As shown by a comparison of Figures 8 and 9 of the drawings, it has been found practical in some instances to have the cutting edge 50 of the tool body 51 inclined at an angle approximately equal to the angle of inclination of the cutter teeth.

The degree of concavity formed in the cutter body will depend upon the obliquity of the cutting edge of the tool and the degree of curvature of the arc through which it sweeps. The greater the obliquity of the cutting edge, other things being equal, the greater will be the resulting concavity, and, other things being equal, the shorter the radius of the arc, the greater will be the resulting concavity. Consequently these factors will be selected in accordance with circumstances, especially the character of the steel to be used for the work.

For practical reasons it is desirble to rotate the work about its axis and feed the tool up slowly through the arc described and with a simultaneous backing-off movement. It will be understood, however, that the same result would be produced by holding the work still and producing a movement in the tool compounded of a rotary movement about the tool axis, an arcuate movement and a backing-off movement.

Having thus described my invention what I claim as new and desire to secure by Letters Patent is:—

1. The method of producing cutters and the like consisting in rotating the work, presenting a tool to it with its cutting edge askew to the work axis, and moving the tool along an orbit tangential to the work and enveloping it.

2. The method of producing cutters and the like consisting in rotating the work about its axis, presenting a tool to it so that the cutting edge is oblique to the work axis and lies in a different plane from the work axis, moving the tool through an arc tangential to the work with the concave side of said arc toward the work, and producing a relative movement between the tool and the work radially of the work, to produce relief in the teeth of the work.

3. The method of producing helically fluted cutters, consisting in rotating the work, presenting a cutting tool to it with its cutting edge askew to the work axis, producing relative bodily movement between the tool and the work so as to move one of said parts along an orbit tangential to the work, which orbit encircles the work, the point of contact between the tool and the work following the point of tangency of the tool with the work, producing a relative bodily movement radially of the work to produce relief in the cutter teeth, and modifying the rotary movement of the work to compensate for the helical lead of the flutes.

4. The method of producing cutters and the like consisting in rotating the work about its axis, presenting a tool to the work, the profile of which when projected, will be the same as desired in the work to be produced by the cutter, with the line of the cutting edge of the tool askew to the work axis, and producing relative feed through an arc centered on an axis parallel to the work axis and on the opposite side thereof relative to the cutting edge of the tool.

5. The method of producing cutters and the like from a helically gashed work body, consisting in rotating the work about its axis, bringing a tool into contact with the work with the cutting edge of the tool askew to the work axis, producing relative bodily movement between the work and the tool so as to move one of said parts in an orbit encircling the work, the point of contact between the tool and the work following the point of tangency of the tool with the work and also producing relative bodily movement between the work and the tool in a direction radial to the work to produce relief in the teeth of the work.

6. The method of producing cutters and the like from a helically gashed work body, consisting in rotating the work about its axis, bringing a tool into contact with the work with the cutting edge of the tool at an angle approximately equal to the helix angle of the gashes, producing relative bodily movement between the work and the tool with the edge of the tool following in an orbit encircling the work and a point in the edge in tangential contact with the work moving across the face of the work, and also producing relative bodily movement between the work and the tool in a direction radial to the work to produce relief in the teeth of the work.

7. The method of producing cutters and the like from a helically gashed work body, consisting in rotating the work about its axis, bringing the tool into contact with the work with the cutting edge of the tool askew to the axis of the work, producing relative bodily movement between the work and the tool with the edge of the tool following in an orbit encircling the work, also producing relative bodily movement between the work and the tool in a direction radial to the work to produce relief in the teeth of the work, and modifying the rate of rotation of the work to compensate for the helical lead of the gashes.

8. The method of forming the teeth in a milling cutter having angularly inclined teeth, consisting in rotating the cutter blank, holding a tool in contact with it with the cutting edge of the tool angularly disposed with respect to the cutter axis in conformity with the inclination of the cutter teeth, producing an arcuated movement of the tool tangentially to the cutter periphery, moving the tool transversely to the cutter axis to produce relief in the cutter teeth, and coordinating the arcuate movement and the transverse movement of the tool and the rotation of the cutter to maintain the point of tangency in a plane substantially containing the cutter teeth, the cutter axis and the axis of the arcuated movement.

9. The method of producing correctly formed hardened tools consisting in predetermining the amount and character of distortation of the tool body, forming a tooth in the tool body with a contour which is erroneous by the amount and character of distortation which will be produced in hardening the tool, and finally heating and hardening the tool.

10. The method of producing helically gashed hardened formed cutters consisting in presenting a cutting tool to the work with a projected profile exactly like the one required in the work to be produced by the cutter, rotating the cutter body, holding the cutting tool with its cutting edge in a line non-parallel and non-intersecting with the axis of the cutter body, moving the tool through an orbit tangential to the cutter body, the orbit encircling the cutter body, producing a relative bodily movement between the work and the tool radially of the work to produce relief in the cutter teeth, and modifying the rate of rotation of the work to compensate for the helical lead of the gashes.

11. The method of producing a hardened cutter having teeth conforming to a given specific profile, consisting in presenting a tool to the work with the profile of its cutting edge, when projected on a diametral plane, complementary to the profile of the desired cutter, holding the tool in contact with the work but with the line of its cutting edge askew to the axis of rotation of the work, causing relative rotation between the work and the tool about the axis of the work, so as to move the tool through an orbit which encircles the work, and causing relative movement between the work and the tool in a direction radial to the work to produce relief in the teeth of the work.

12. The method of producing helically fluted hardened cutters having teeth conforming to a given specific profile, consisting in presenting a tool to the work with the profile of its cutting edge, when projected on a diametral plane, complementary to the profile of the desired cutter, holding the tool in contact with the work but with the line of its cutting edge askew to the axis of rotation of the work causing relative rotation between the work and the tool, so as to move the tool through an orbit which encircles the work about the axis of the work, causing relative movement between the work and the tool in a direction radial to the work to produce relief in the teeth of the work, and modifying the rate of rotation of the work in accord with the helical lead of the flutes.

13. The method of producing rotary cutters which consists in predetermining the amount and character of the distortion which the cutter body experiences when subjected to a hardening process, rotating the cutter body, presenting a tool to it with its cutting edge askew to the work axis and moving the tool along an orbit, tangentially to the work and enveloping it so as to cause a predetermined amount of stock to be removed from the cutter body which will exactly compensate for the distortion experienced by the cutter body during the hardening thereof, and finally heating and hardening the cutter.

14. The method of producing rotary cutters having formed teeth which consists in predetermining the amount and character of distortion which the cutter body experiences when subjected to a hardening process, rotating the cutter body, presenting a tool to it with its cutting edge askew to the work axis, said tool having a profile which when projected conforms to the shape of the work which is desired to be produced by the cutter, and moving the tool along an orbit tangential to the work and enveloping it so that teeth having a desired shape will be produced and a proper amount of stock removed to compensate for distortion of the cutter body experienced during the hardening thereof, and then finally heating and hardening the tool.

15. The method of producing correctly formed hardened rotary cutters which consists in predetermining the amount and character of the distortion of the cutter body which would result from heat treatment, forming a plurality of peripheral teeth in said cutter body with a contour which is erroneous by the amount and character of distortion which will be produced in hardening the cutter, and finally heating and hardening said cutter.

In witness whereof, I have hereunto subscribed my name.

CARL G. OLSON.